(12) United States Patent
Matsubara

(10) Patent No.: US 9,903,465 B2
(45) Date of Patent: Feb. 27, 2018

(54) POWER TRANSFER DEVICE

(71) Applicant: AISIN AW CO., LTD., Anjo-shi, Aichi-ken (JP)

(72) Inventor: Mitsumasa Matsubara, Nagoya (JP)

(73) Assignee: AISIN AW CO., LTD., Aichi-ken (JP)

( * ) Notice: Subject to any disclaimer, the term of this patent is extended or adjusted under 35 U.S.C. 154(b) by 0 days.

(21) Appl. No.: 15/117,792

(22) PCT Filed: Mar. 19, 2015

(86) PCT No.: PCT/JP2015/058163
§ 371 (c)(1),
(2) Date: Aug. 10, 2016

(87) PCT Pub. No.: WO2015/146760
PCT Pub. Date: Oct. 1, 2015

(65) Prior Publication Data
US 2017/0009872 A1    Jan. 12, 2017

(30) Foreign Application Priority Data

Mar. 27, 2014  (JP) ................................. 2014-066370

(51) Int. Cl.
*F16H 57/04* (2010.01)
*F16H 37/08* (2006.01)
*F16H 3/66* (2006.01)

(52) U.S. Cl.
CPC ....... *F16H 57/0483* (2013.01); *F16H 57/045* (2013.01); *F16H 57/0423* (2013.01);
(Continued)

(58) Field of Classification Search
None
See application file for complete search history.

(56) References Cited

U.S. PATENT DOCUMENTS

| 8,371,978 B2 | 2/2013 | Nobata et al. |
| 2004/0224809 A1 | 11/2004 | Hayes et al. |

(Continued)

FOREIGN PATENT DOCUMENTS

| EP | 1 475 247 A2 | 11/2004 |
| JP | 07-041128 U | 7/1995 |

(Continued)

OTHER PUBLICATIONS

International Search Report for PCT/JP2015/058163 dated Jun. 16, 2015 [PCT/ISA/210].

(Continued)

*Primary Examiner* — Colby M Hansen
(74) *Attorney, Agent, or Firm* — Sughrue Mion, PLLC

(57) ABSTRACT

A differential ring gear is a helical gear disposed so as to rake up working oil in a differential chamber obliquely toward a working oil storage chamber 65 when the differential ring gear is rotated in the main rotational direction. A ring gear covering portion of a reservoir plate that separates the differential chamber and the working oil storage chamber from each other is provided with first and second guide portions along upper edge portions of first and second opening portions configured to discharge the working oil raked up by the differential ring gear. Lower surfaces of the first and second guide portions are formed to be inclined upward toward the working oil storage chamber.

18 Claims, 8 Drawing Sheets

(52) U.S. Cl.
CPC ..... *F16H 57/0424* (2013.01); *F16H 57/0452* (2013.01); *F16H 57/0457* (2013.01); *F16H 3/663* (2013.01); *F16H 37/0813* (2013.01); *F16H 2200/006* (2013.01); *F16H 2200/2007* (2013.01); *F16H 2200/2046* (2013.01); *F16H 2200/2066* (2013.01); *F16H 2200/2082* (2013.01)

(56) References Cited

U.S. PATENT DOCUMENTS

| | | | | |
|---|---|---|---|---|
| 2008/0207385 | A1* | 8/2008 | Nishida | F16D 25/0638 |
| | | | | 475/276 |
| 2008/0220928 | A1* | 9/2008 | Nishida | F16H 3/663 |
| | | | | 475/275 |
| 2008/0269003 | A1* | 10/2008 | Bauknecht | F16H 3/663 |
| | | | | 475/276 |
| 2011/0245010 | A1 | 10/2011 | Nobata et al. | |

FOREIGN PATENT DOCUMENTS

| | | |
|---|---|---|
| JP | 2014-015979 A | 1/2014 |
| WO | 2011/121861 A1 | 10/2011 |

OTHER PUBLICATIONS

Written Opinion for PCT/JP2015/058163 dated Jun. 16, 2015 [PCT/ISA/237].

* cited by examiner

FIG. 2

|  |  | C-1 | C-2 | C-3 | C-4 | B-1 | B-2 | F-1 |
|---|---|---|---|---|---|---|---|---|
| D | 1st | ○ |  |  |  |  | ● | ○ |
|  | 2nd | ○ |  |  |  | ○ |  |  |
|  | 3rd | ○ |  | ○ |  |  |  |  |
|  | 4th | ○ |  |  | ○ |  |  |  |
|  | 5th | ○ | ○ |  |  |  |  |  |
|  | 6th |  | ○ |  | ○ |  |  |  |
|  | 7th |  | ○ | ○ |  |  |  |  |
|  | 8th |  | ○ |  |  | ○ |  |  |
| REV1 |  |  |  | ○ |  |  | ○ |  |
| REV2 |  |  |  |  | ○ |  | ○ |  |

※○: ENGAGED,
●: ENGAGED WITH ENGINE BRAKE IN OPERATION

POWER TRANSFER DEVICE

CROSS REFERENCE TO RELATED APPLICATIONS

This application is a National Stage of International Application No. PCT/JP2015/058163 filed Mar. 19, 2015, claiming priority based on Japanese Patent Application No. 2014-066370 filed Mar. 27, 2014, the contents of all of which are incorporated herein by reference in their entirety.

TECHNICAL FIELD

The disclosure according to the present disclosure relates to a power transfer device that includes a partitioning member that partitions a space in a case into a differential chamber, in which a differential ring gear and a differential gear are disposed, and a working oil storage chamber, in which working oil is stored.

BACKGROUND ART

There has hitherto been known a power transfer device that includes a reservoir plate that partitions a space in a case member that houses a speed change mechanism and a differential device (differential gear) into a differential chamber, in which the differential device is disposed, and a storage chamber, in which oil (working oil) is stored (see Patent Document 1, for example). In the power transfer device, the reservoir plate is disposed so as to cover the differential device in the case member and tightly contact the inner peripheral surface of a rib member that extends from the case member along the outer peripheral surface of a ring gear (differential ring gear) of the differential device. Consequently, in the power transfer device, a residence of oil in the differential chamber, in particular around the ring gear of the differential device, is suppressed to suppress an increase in rotational resistance of the ring gear.

RELATED-ART DOCUMENTS

[Patent Documents]
  [Patent Document 1] International Publication WO 2011/121861

SUMMARY

In the power transfer device according to the related art, oil in the differential chamber raked up by rotation of the ring gear is discharged to the outside of the differential chamber via a notch formed in the rib member, and hits on a wall member of the reservoir plate inserted into the notch to be guided toward the storage chamber. However, a part of oil discharged from the notch in the rib member to the outside of the differential chamber may collide against the wall member, flow downward, and flow from the notch into the differential chamber again. Therefore, with the power transfer device according to the related art, a residence of oil in the differential chamber may not be suppressed well.

It is therefore a main object of the present disclosure to better suppress a residence of working oil in a differential chamber by a partitioning member that separates a differential chamber, in which a differential ring gear and a differential gear are disposed, and a working oil storage chamber, in which working oil is stored, from each other.

The present disclosure provides a power transfer device including: a differential ring gear meshed with a drive pinion gear to which power from a transmission is transferred; a differential gear coupled to the differential ring gear; a case that houses the differential ring gear and the differential gear; and a partitioning member that partitions a space in the case into a differential chamber, in which the differential ring gear and the differential gear are disposed, and a working oil storage chamber, in which working oil is stored, and further including: a ring gear covering portion that has an opening portion configured to discharge working oil raked up by the differential ring gear to an outside of the differential chamber and a guide portion that extends along an upper edge portion of the opening portion and that projects from an outer peripheral surface toward an outer side in a radial direction of the differential ring gear, the ring gear covering portion covering a part of an outer peripheral surface of the differential ring gear, in which: the differential ring gear is a helical gear disposed so as to rake up working oil in the differential chamber obliquely toward the working oil storage chamber when the differential ring gear is rotated in a main rotational direction; and a lower surface of the guide portion is formed to be inclined upward toward the working oil storage chamber.

In the power transfer device, when the differential ring gear is rotated in the main rotational direction, working oil in the differential chamber is raked up obliquely toward the working oil storage chamber by rotation of the differential ring gear, and discharged to the outside of the differential chamber via the opening portion in the ring gear covering portion. A part of the working oil discharged from the opening portion hits on the lower surface of the guide portion which extends along the upper edge portion of the opening portion and which projects in the radial direction of the differential ring gear from the outer peripheral surface to be led toward the working oil storage chamber. In this event, with the lower surface of the guide portion formed to be inclined upward toward the working oil storage chamber, that is, inclined in the same direction as the scattering direction of working oil raked up by rotation of the differential ring gear, working oil that has collided against the lower surface of the guide portion can be splashed back toward the working oil storage chamber without flowing directly downward. As a result, it is possible to better suppress working oil that has collided against the lower surface of the guide portion flowing directly downward to flow from the opening portion into the differential chamber again. Thus, with the power transfer device, it is possible to better suppress a residence of working oil in the differential chamber by the partitioning member which separates the differential chamber, in which the differential ring gear and the differential gear are disposed, and the working oil storage chamber, in which working oil is stored, from each other.

BRIEF DESCRIPTION OF THE DRAWINGS

FIG. 2 is an operation table illustrating the relationship between each shift speed of an automatic transmission included in the power transfer device of FIG. 1 and the respective operating states of clutches and brakes.

DETAILED DESCRIPTION OF THE PREFERRED EMBODIMENT

Now, an embodiment according to the present disclosure will be described with reference to the drawings.

Figure 1:
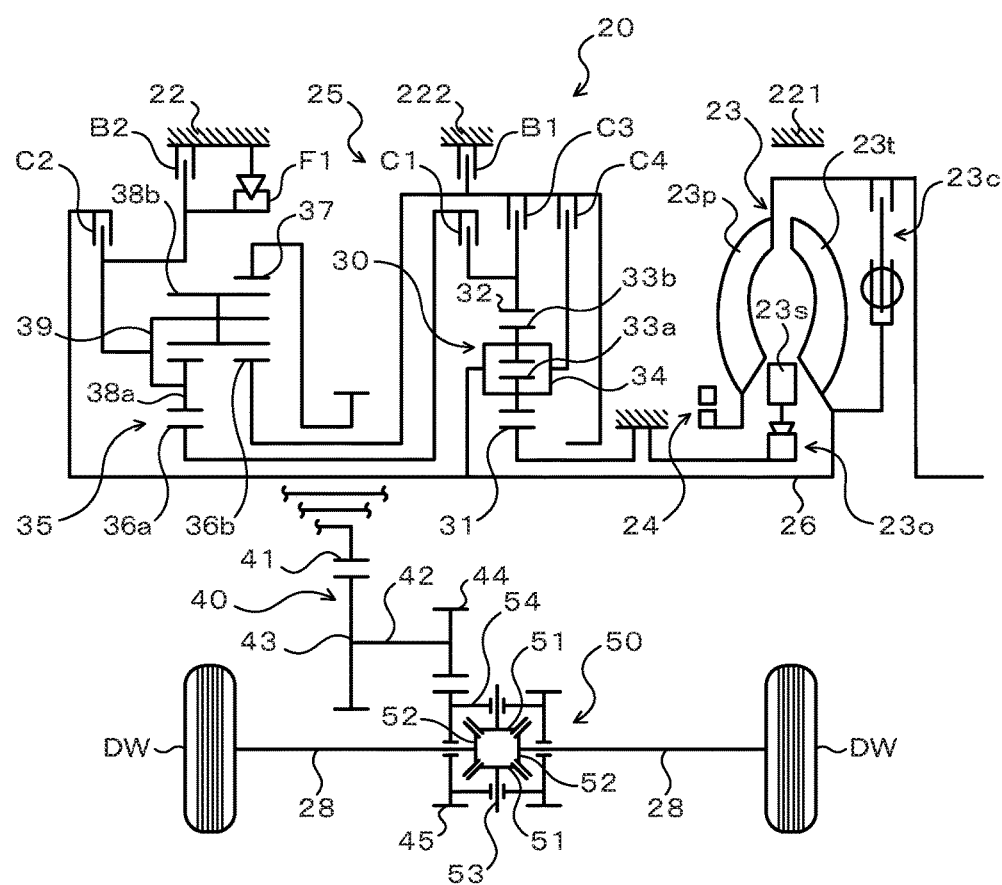
FIG. 1 is a schematic configuration diagram of a power transfer device according to an embodiment of the present disclosure.

FIG. 1 is a schematic configuration diagram of a power transfer device 20 according to an embodiment of the present disclosure. The power transfer device 20 illustrated in the drawing is connected to a crankshaft of an engine (not illustrated) mounted on a front-drive vehicle, and can transfer power from the engine to left and right drive wheels (front wheels) DW. As illustrated in the drawing, the power transfer device 20 includes a transmission case 22 that includes a converter housing 221 and a transaxle case 222 coupled to the converter housing 221, a fluid transmission apparatus (starting device) 23 housed in the converter housing 221, an oil pump 24, an automatic transmission 25 housed in the transaxle case 222, a gear mechanism (gear train) 40, a differential gear (differential mechanism) 50, and so forth.

The fluid transmission apparatus 23 is structured as a torque converter that includes a pump impeller 23p on the input side connected to the crankshaft of the engine, a turbine runner 23t on the output side connected to an input shaft 26 of the automatic transmission 25, a stator 23s disposed on the inner side of the pump impeller 23p and the turbine runner 23t to rectify the flow of working oil from the turbine runner 23t to the pump impeller 23p, a one-way clutch 23o that restricts the rotational direction of the stator 23s to one direction, a lock-up clutch 23c, and so forth. It should be noted, however, that the fluid transmission apparatus 23 may be structured as a fluid coupling that does not include the stator 23s.

The oil pump 24 is structured as a gear pump that includes a pump assembly composed of a pump body and a pump cover, and an externally toothed gear connected to the pump impeller 23p of the fluid transmission apparatus 23 via a hub. The oil pump 24 is driven by power from the engine to suction working oil (ATF) stored in the transmission case 22 via a strainer (not illustrated) and pump the working oil to a hydraulic control device (not illustrated).

The automatic transmission 25 is structured as an 8-speed transmission. As illustrated in FIG. 1, the automatic transmission 25 includes a double-pinion type first planetary gear mechanism 30, a Ravigneaux type second planetary gear mechanism 35, and four clutches C1, C2, C3, and C4, two brakes B1 and B2, and a one-way clutch F1 that change a power transfer path from the input side to the output side.

The first planetary gear mechanism 30 includes a sun gear 31 which is an externally toothed gear, a ring gear 32 which is an internally toothed gear disposed concentrically with the sun gear 31, and a planetary carrier 34 that rotatably and revolvably holds a plurality of sets of two pinion gears 33a and 33b meshed with each other, one of the pinion gears 33a and 33b being meshed with the sun gear 31 and the other being meshed with the ring gear 32. As illustrated in the drawing, the sun gear 31 of the first planetary gear mechanism 30 is held stationary to the transmission case 22, and the planetary carrier 34 of the first planetary gear mechanism 30 is connected so as to be rotatable together with the input shaft 26. In addition, the first planetary gear mechanism 30 is structured as a so-called speed reduction gear, and reduces the speed of power transferred to the planetary carrier 34 which serves as an input element to output the power from the ring gear 32 which serves as an output element.

The second planetary gear mechanism 35 includes a first sun gear 36a and a second sun gear 36b which are each an externally toothed gear, a ring gear 37 which is an internally toothed gear disposed concentrically with the first and second sun gears 36a and 36b, a plurality of short pinion gears 38a meshed with the first sun gear 36a, a plurality of long pinion gears 38b meshed with the second sun gear 36b and the plurality of short pinion gears 38a and meshed with the ring gear 37, and a planetary carrier 39 that rotatably and revolvably holds the plurality of short pinion gears 38a and the plurality of long pinion gears 38b. The ring gear 37 of the second planetary gear mechanism 35 functions as an output member of the automatic transmission 25. Power transferred from the input shaft 26 to the ring gear 37 is transferred to the left and right drive wheels via the gear mechanism 40, the differential gear 50, and a drive shaft 28. In addition, the planetary carrier 39 is supported by the transmission case 22 via the one-way clutch F1. The rotational direction of the planetary carrier 39 is restricted to one direction by the one-way clutch F1.

The clutch C1 is a multi-plate friction-type hydraulic clutch that has a hydraulic servo structured from a piston, a plurality of friction plates and separator plates, an oil chamber supplied with working oil, and so forth, and that is capable of connecting and disconnecting the ring gear 32 of the first planetary gear mechanism 30 and the first sun gear 36a of the second planetary gear mechanism 35 to and from each other. The clutch C2 is a multi-plate friction-type hydraulic clutch that has a hydraulic servo structured from a piston, a plurality of friction plates and separator plates, an oil chamber supplied with working oil, and so forth, and that is capable of connecting and disconnecting the input shaft 26 and the planetary carrier 39 of the second planetary gear mechanism 35 to and from each other. The clutch C3 is a multi-plate friction-type hydraulic clutch that has a hydraulic servo structured from a piston, a plurality of friction plates and separator plates, an oil chamber supplied with working oil, and so forth, and that is capable of connecting and disconnecting the ring gear 32 of the first planetary gear mechanism 30 and the second sun gear 36b of the second planetary gear mechanism 35 to and from each other. The clutch C4 is a multi-plate friction-type hydraulic clutch that has a hydraulic servo structured from a piston, a plurality of friction plates and separator plates, an oil chamber supplied with working oil, and so forth, and that is capable of connecting and disconnecting the planetary carrier 34 of the first planetary gear mechanism 30 and the second sun gear 36b of the second planetary gear mechanism 35 to and from each other.

The brake B1 is a multi-plate friction-type hydraulic brake that has a hydraulic servo structured from a plurality of friction plates and separator plates, an oil chamber supplied with working oil, and so forth, and that is capable of making the second sun gear 36b of the second planetary gear mechanism 35 stationary and rotatable with respect to the transmission case 22. The brake B2 is a multi-plate friction-type hydraulic brake that has a hydraulic servo structured from a plurality of friction plates and separator plates, an oil chamber supplied with working oil, and so forth, and that is capable of making the planetary carrier 39 of the second planetary gear mechanism 35 stationary and rotatable with respect to the transmission case 22.

In addition, the one-way clutch F1 includes an inner race coupled (fixed) to the planetary carrier 39 of the second planetary gear mechanism 35, an outer race, a plurality of sprags, a plurality of springs (plate springs), a retainer, and so forth. The one-way clutch F1 transfers torque via the sprags when the outer race is rotated in one direction with respect to the inner race, and allows the inner race and the outer race to rotate relative to each other when the outer race is rotated in the other direction with respect to the inner race. It should be noted, however, that the one-way clutch F1 may be of a roller type or the like, rather than the sprag type.

The clutches C1 to C4 and the brakes B1 and B2 operate with working oil supplied thereto and discharged therefrom by the hydraulic control device (not illustrated). FIG. 2 is an operation table illustrating the relationship between each shift speed of the automatic transmission 25 and the respective operating states of the clutches C1 to C4, the brakes B1 and B2, and the one-way clutch F1. The automatic transmission 25 provides first to eighth forward speeds and first and second reverse speeds when the clutches C1 to C4 and the brakes B1 and B2 are brought into the respective states illustrated in the operation table of FIG. 2. At least one of the clutches C1 to C4 and the brakes B1 and B2 may be a meshing engagement element such as a dog clutch.

The gear mechanism 40 has: a counter drive gear 41 coupled to the ring gear 37 of the second planetary gear mechanism 35 of the automatic transmission 25; a counter driven gear 43 fixed to a counter shaft 42 that extends in parallel with the input shaft 26 of the automatic transmission 25 and meshed with the counter drive gear 41; a drive pinion gear 44 which is formed on (or fixed to) the counter shaft 42 and to which power from the automatic transmission 25 is transferred via the counter drive gear 41, the counter driven gear 43, and the counter shaft 42; and a differential ring gear 45 meshed with the drive pinion gear 44.

As illustrated in FIG. 1, the differential gear 50 has: a pair of (two) pinion gears 51; a pair of (two) side gears 52 each fixed to the drive shaft 28 and meshed with the pair of pinion gears 51 at a right angle; a pinion shaft 53 that supports the pair of pinion gears 51; and a differential case 54 which houses the pair of pinion gears 51 and the pair of side gears 52 and to which the differential ring gear 45 is coupled (fixed). In the embodiment, the pinion gears 51 and the side gears 52 are each structured as a straight bevel gear. The differential case 54 is rotatably supported by the transmission case 22 via a bearing (not illustrated) coaxially with the drive shaft 28.

Subsequently, an essential portion of the power transfer device 20 will be described with reference to FIGS. 3 to 5. As illustrated in the drawings, a space inside the transmission case 22 is partitioned by a reservoir plate (partitioning member) 70 into a differential chamber 60 (see FIGS. 4 and 5), in which the differential ring gear 45 and the differential gear 50 are disposed, and a working oil storage chamber 65 (see FIGS. 3 to 5), in which working oil is stored. In the following description, the terms "upper" and "lower" indicate the "upper" and "lower" sides, respectively, in the vertical direction with the power transfer device 20 mounted on the vehicle.

Figure 3:
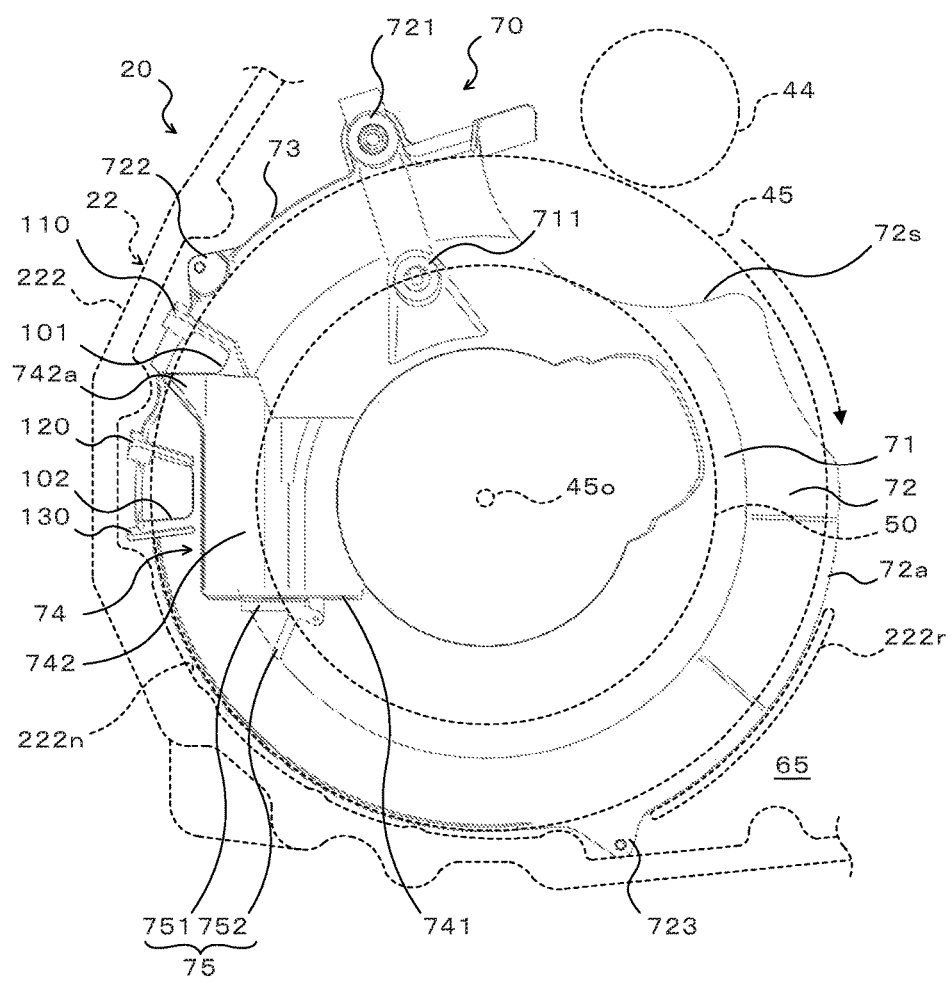
FIG. 3 is a front view illustrating a reservoir plate included in the power transfer device of FIG. 1.
Figure 4:
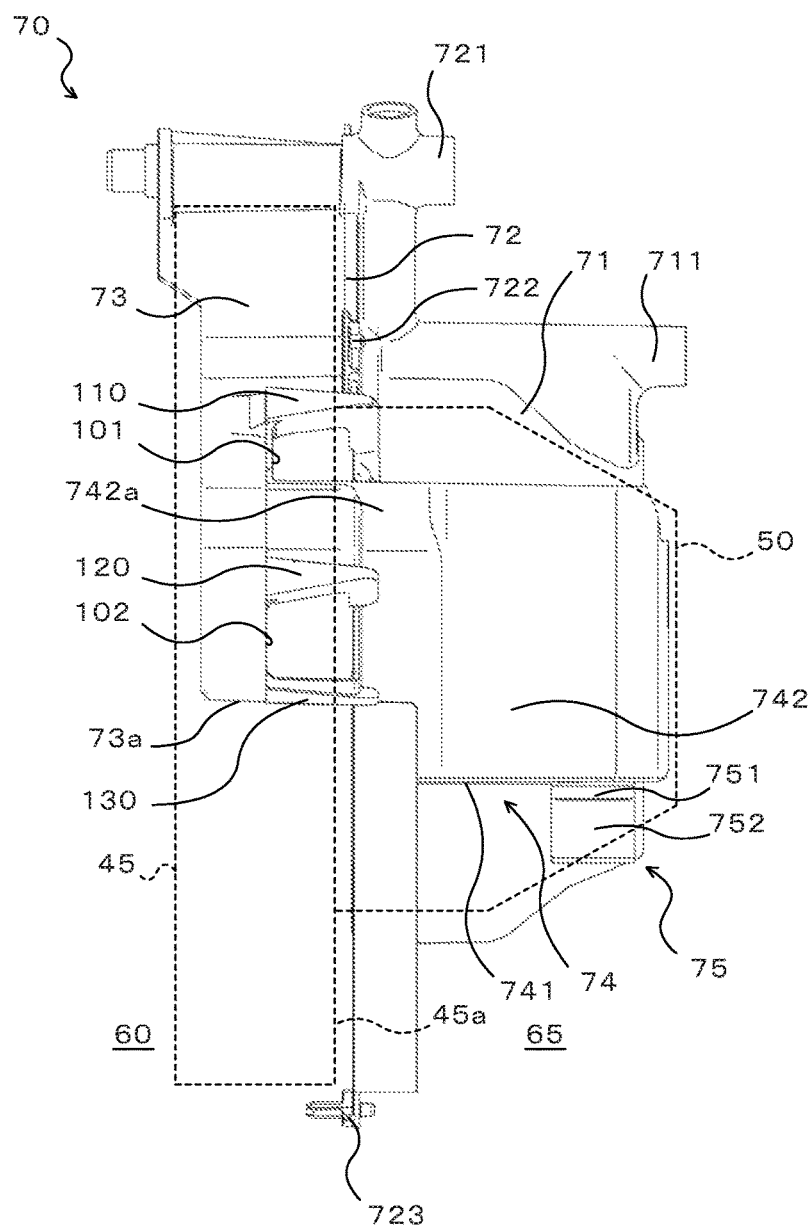
FIG. 4 is a side view illustrating the reservoir plate.
Figure 5:
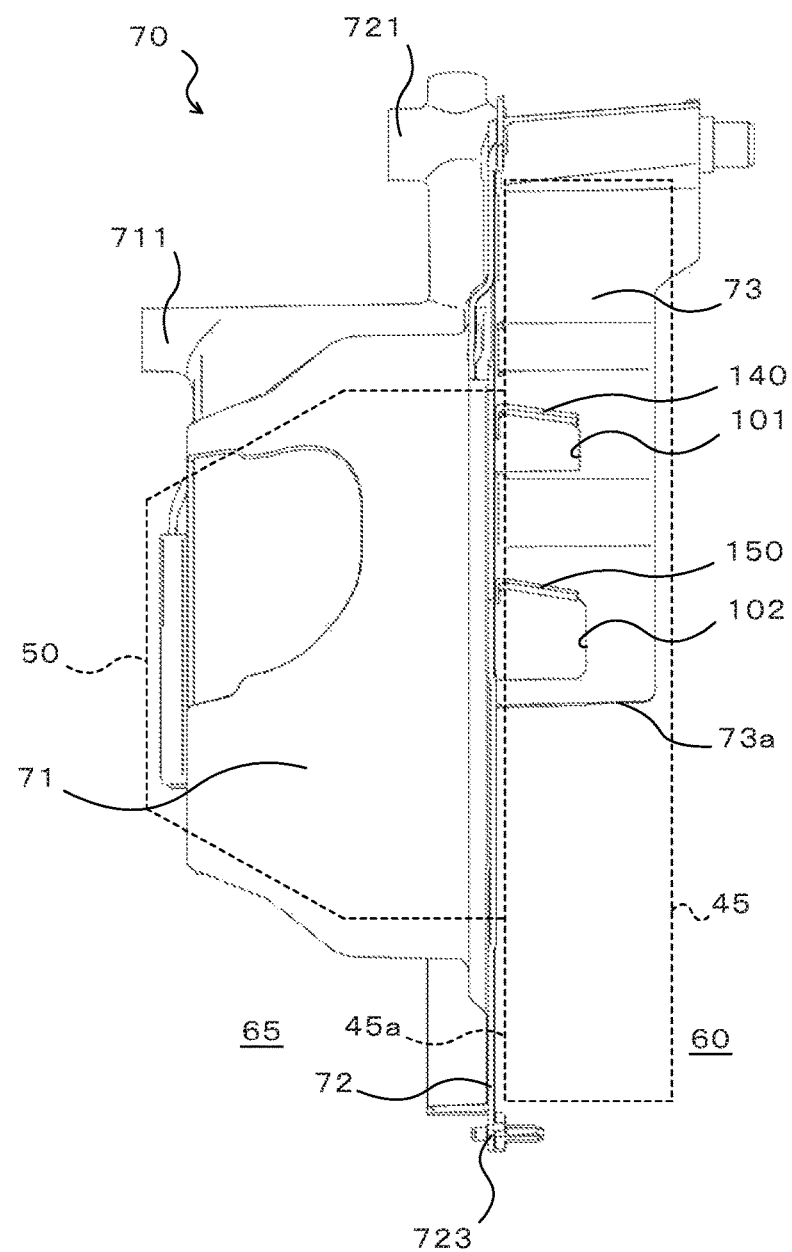
FIG. 5 is a side view illustrating the reservoir plate.

As illustrated in FIGS. 3 to 5, the reservoir plate 70 includes: a differential covering portion 71 that extends in the axial direction of the differential ring gear 45 so as to cover a part of the differential gear 50 from the outer side; a flange portion 72 that extends from the differential covering portion 71 toward the outer side in the radial direction of the differential ring gear 45; and a ring gear covering portion 73 formed at an outer peripheral edge portion 72a of the flange portion 72. The reservoir plate 70 which is structured from the differential covering portion 71, the flange portion 72, and the ring gear covering portion 73 is integrally molded from a resin. It should be noted, however, that the reservoir plate 70 may be molded from a material other than a resin. In addition, the ring gear covering portion 73 may be separated from the reservoir plate 70. For example, the ring gear covering portion 73 may extend from the transmission case 22, for example.

As illustrated in FIGS. 4 and 5, the differential covering portion 71 is formed to extend along a part of the outer peripheral surface of the differential gear 50 (differential case 54), and mainly surrounds a portion of the differential gear 50 to which the differential ring gear 45 is attached and a portion of the differential gear 50 excluding an end portion on the side opposite to the differential ring gear 45. The outer peripheral surface of the differential covering portion 71 on the upper side is provided with a fixed portion 711 that is fixed to the converter housing 221. In the embodiment, the converter housing 221 is fastened to an end surface of the transaxle case 222 illustrated in FIG. 3 by a plurality of bolts, and defines the working oil storage chamber 65 together with the transaxle case 222 and the reservoir plate 70.

As illustrated in FIGS. 4 and 5, the flange portion 72 extends from one end of the differential covering portion 71 on the differential ring gear 45 side (on the left side in FIG. 4), and opposes a side surface 45a of the differential ring gear 45 on the working oil storage chamber 65 side with the reservoir plate 70 disposed in the transmission case 22. In addition, as illustrated in FIG. 3, the flange portion 72 is provided with a notched portion 72s formed so as to avoid interference with the drive pinion gear 44. Consequently, the flange portion 72 extends in an arc shape (generally C-shape) along the outer periphery of the differential covering portion 71. In addition, first to third fixed portions 721, 722, and 723 to be fixed to the converter housing 221 and the transaxle case 222 are formed at the outer peripheral edge portion 72a of the flange portion 72.

The ring gear covering portion 73 extends from the upper portion of the outer peripheral edge portion 72a of the flange portion 72 toward the side opposite to the differential covering portion 71 in the axial direction of the differential ring gear 45. The ring gear covering portion 73 has an arc shape along the outer peripheral surface of the differential ring gear 45, and covers about one-fourth of the outer peripheral surface of the differential ring gear 45 from above with the reservoir plate 70 disposed in the transmission case 22. Consequently, a downward flow of working oil splashed from above the reservoir plate 70 (above the differential ring gear 45) in the transaxle case 222 into the differential chamber 60 can be suppressed well by the ring gear covering portion 73.

In the embodiment, as illustrated in FIG. 3, the transaxle case 222 has an inner peripheral surface 222n that has an arc shape along the outer peripheral surface of the differential ring gear 45, and a rib portion 222r formed so as to have an inner peripheral surface of generally the same radius of curvature as that of the inner peripheral surface 222n to surround a part of the outer peripheral surface of the differential ring gear 45. The reservoir plate 70 is disposed in the transmission case 22 such that a part of the outer peripheral edge portion 72a of the flange portion 72 extends along the inner peripheral surface 222n of the transaxle case 222 and the inner peripheral surface of the rib portion 222r, and fixed to the converter housing 221 and the transaxle case 222 at the fixed portion 711 which is formed in the differential covering portion 71 and the first to third fixed portions 721, 722, and 723 which are formed in the outer peripheral edge portion 72a of the flange portion 72.

A seal member (not illustrated) is interposed between a part of the outer peripheral edge portion 72a of the flange portion 72 and the inner peripheral surface 222n of the transaxle case 222 and the inner peripheral surface of the rib portion 222r. Consequently, the space in the transmission case 22 is partitioned by the differential covering portion 71 and the flange portion 72 of the reservoir plate 70 into the differential chamber 60 and the working oil storage chamber 65, and an inflow of working oil stored in the working oil storage chamber 65 into the differential chamber 60 via a clearance between the outer peripheral edge portion 72a of the flange portion 72 and the inner peripheral surface 222n of the transmission case 22 and the inner peripheral surface of the rib portion 222r can be suppressed well.

As illustrated in FIGS. 3 and 4, the reservoir plate 70 configured as discussed above further includes a filling portion 74 that fills a space defined between the differential covering portion 71 and the flange portion 72 and the transmission case 22 (converter housing 221) on the working oil storage chamber 65 side. The filling portion 74 is disposed to be positioned on the rear side of the vehicle (on the left side in FIG. 3) with respect to the differential covering portion 71 with the power transfer device 20 mounted on the vehicle, has a bottom portion 741 that extends from the differential covering portion 71 toward the inner peripheral surface of the transmission case 22 (converter housing 221), and a wall portion 742 that opposes the flange portion 72 and that extends upward from the peripheral edge portion of the bottom portion 741 so as to extend along the inner peripheral surface of the transmission case 22 (converter housing 221), and opens at the upper portion.

With such a filling portion 74 formed on the reservoir plate 70, it is possible to reduce (eliminate) a space for an inflow of working oil, that is, an extra space that allows an inflow of working oil, between the differential covering portion 71 and the flange portion 72 and the transmission case 22. As a result, it is possible to suppress movement of working oil in the working oil storage chamber 65 toward the rear side of the vehicle when the vehicle on which the power transfer device 20 is mounted starts or the like, and to better restrain the oil pump 24 from suctioning air with a suction port of the strainer (not illustrated), which is disposed in the working oil storage chamber 65, exposed from the oil surface.

Continuously, the structure of the reservoir plate 70 for discharging working oil that has flowed into the differential chamber 60, such as working oil that has flowed downward after being used to lubricate the differential ring gear 45, for example, will be described with reference to FIGS. 6 to 8.

Figure 6:
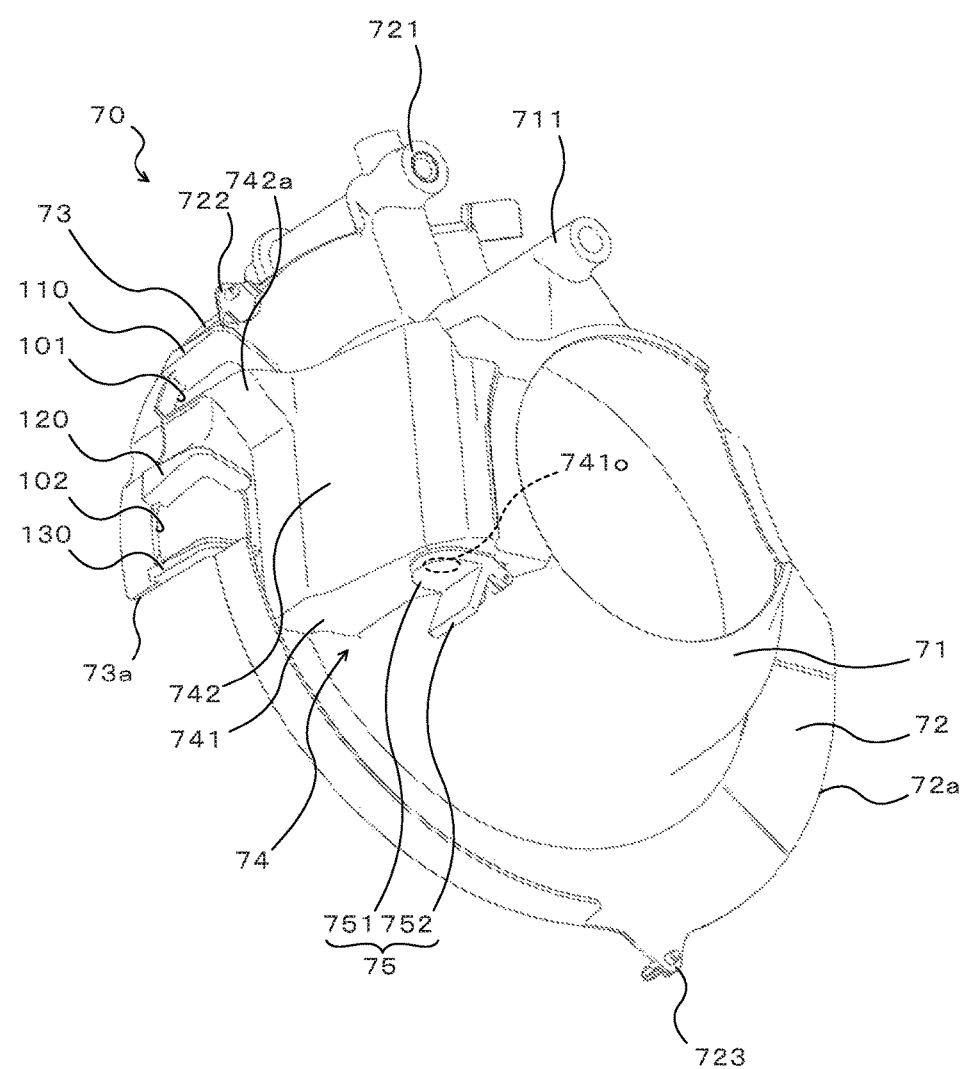
FIG. 6 is a perspective view illustrating the reservoir plate.
Figure 7:
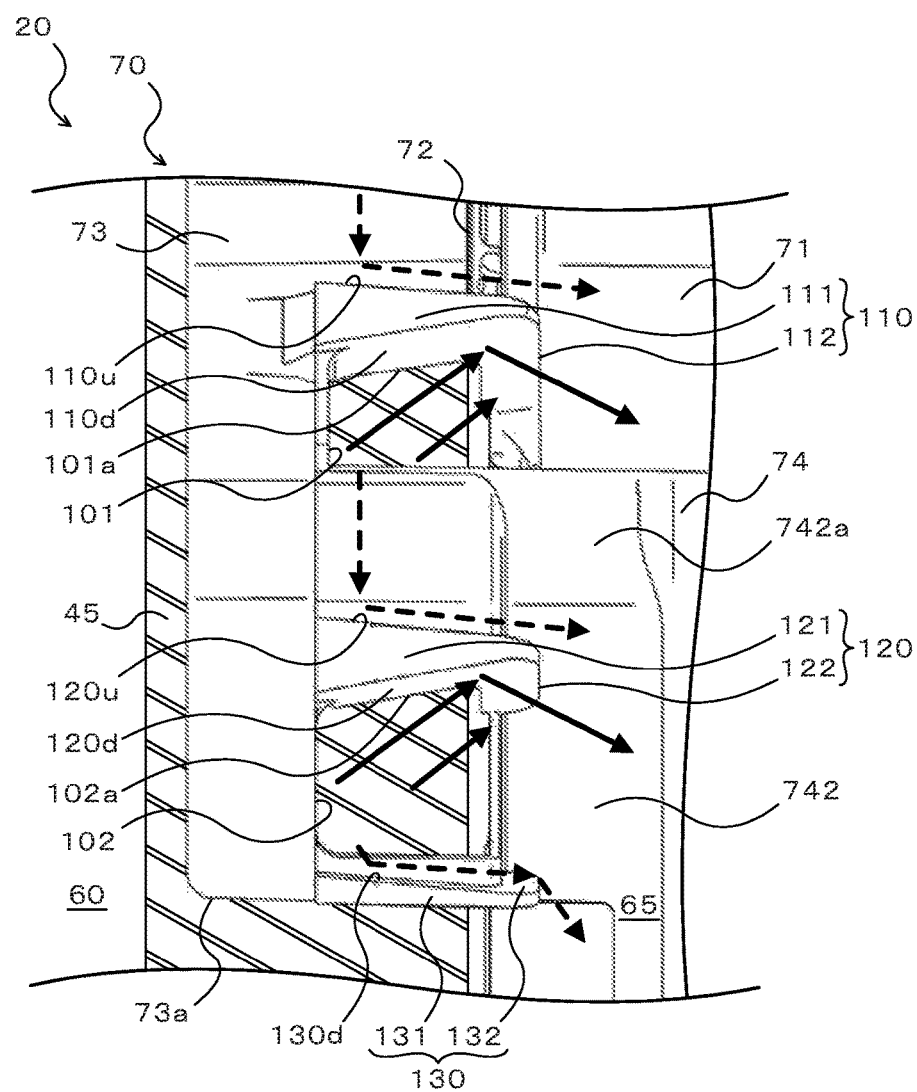
FIG. 7 is an enlarged view illustrating an essential portion of the reservoir plate.
Figure 8:
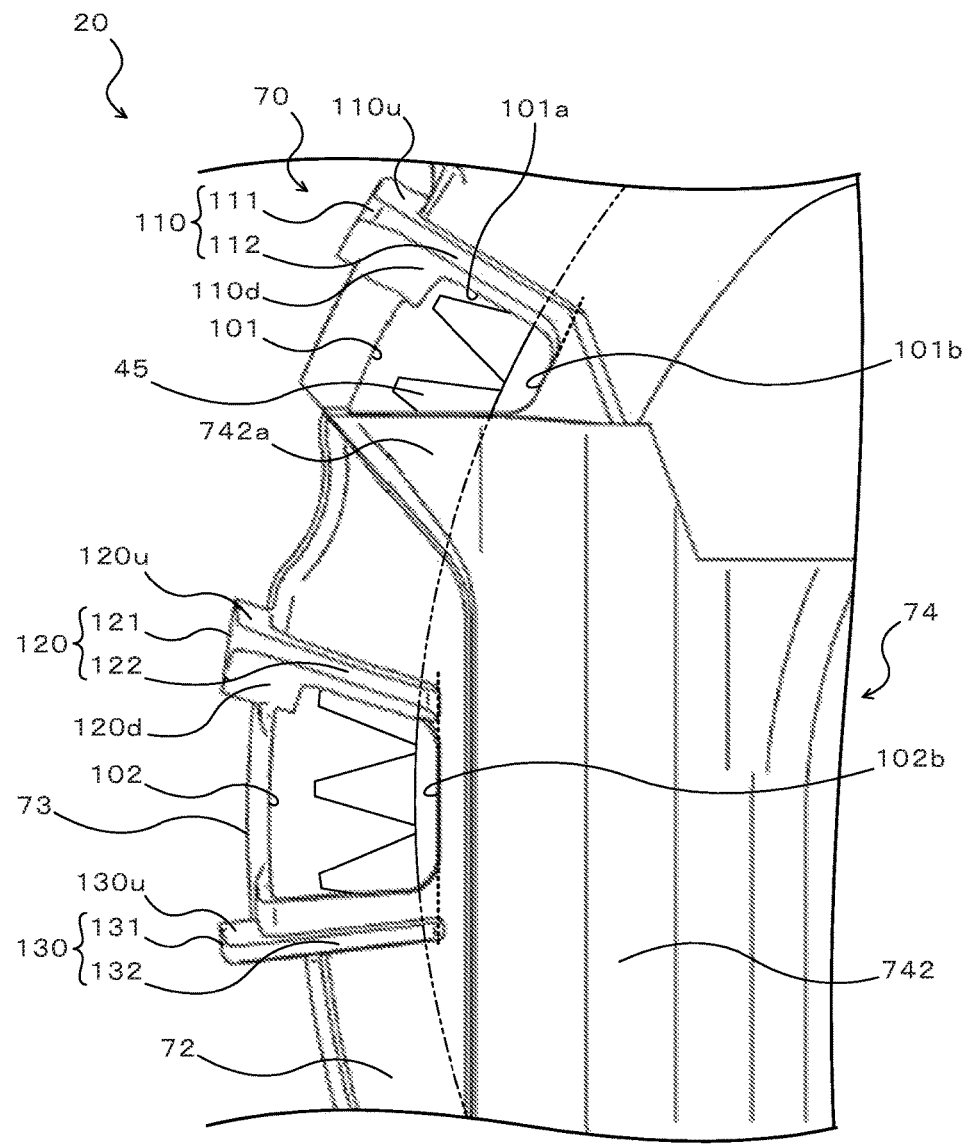
FIG. 8 is an enlarged view illustrating an essential portion of the reservoir plate.

As illustrated in FIGS. 6 to 8, the ring gear covering portion 73 and the flange portion 72 of the reservoir plate 70 have first and second opening portions 101 and 102 formed along the circumferential direction of the differential ring gear 45. The first and second opening portions 101 and 102 are formed across the ring gear covering portion 73 and the flange portion 72 so as to extend from generally the center portion of the ring gear covering portion 73 in the axial direction of the differential ring gear 45 and reach generally the center portion of the flange portion 72 in the radial direction of the differential ring gear 45.

As illustrated in FIG. 8, upper edge portions 101a and 102a of the first and second opening portions 101 and 102 that extend in the flange portion 72 are formed to be inclined downward toward the inner peripheral side of the flange portion 72, that is, toward an axis 45o (see FIG. 3) of the differential ring gear 45. In addition, as illustrated in FIG. 8, edge portions 101b and 102b of the first and second opening portions 101 and 102 on the inner peripheral side of the flange portion 72 are formed on the inner peripheral side of the flange portion 72 with respect to the tooth root (root circle; see the dash-double-dot line in FIG. 8) of the differential ring gear 45, that is, at a position that is proximate to the axis 45o of the differential ring gear 45.

First and second guide portions 110 and 120 that extend along the upper edge portions 101a and 102a of the first and second opening portions 101 and 102 and a third guide portion 130 that extends below the second opening portion 102 are formed on the outer peripheral surface of the ring gear covering portion 73 and a surface of the flange portion 72 on the working oil storage chamber 65 side. Inner guide portions 140 and 150 that extend along the upper edge portions 101a and 102a of the first and second opening portions 101 and 102 are formed on the inner peripheral surface of the ring gear covering portion 73 and a surface of the flange portion 72 on the differential chamber 60 side (see FIG. 5).

As illustrated in FIGS. 7 and 8, the first guide portion 110 has: a radially projecting portion 111 that extends along the upper edge portion 101a of the first opening portion 101 in the ring gear covering portion 73 and that projects in the radial direction of the differential ring gear 45 from the outer peripheral surface of the ring gear covering portion 73; and an axially projecting portion 112 that extends along the upper edge portion 101a of the first opening portion 101 in the flange portion 72 from one end of the radially projecting portion 111 and that projects in the axial direction of the differential ring gear 45 from a surface of the flange portion 72 on the working oil storage chamber 65 side.

As illustrated in FIG. 8, the axially projecting portion 112 of the first guide portion 110 extends so as to be inclined downward toward the inner peripheral side of the flange portion 72 along the upper edge portion 101a of the first opening portion 101 to a position that is generally the same as an extension line (see the broken line in FIG. 8) of the edge portion 101b of the first opening portion 101. Further, the axially projecting portion 112 extends so as to be inclined downward more steeply than the portion which extends along the upper edge portion 101a of the first opening portion 101 toward the inner peripheral side of the flange portion 72 with respect to the first opening portion 101 to the outer peripheral surface of the differential covering portion 71. That is, the axially projecting portion 112 of the first guide portion 110 is formed to extend to the inner peripheral side of the flange portion 72 with respect to the tooth root (root circle) of the differential ring gear 45, that is, to a position that is proximate to the axis 45o (see FIG. 3) of the differential ring gear 45.

In addition, the first guide portion 110 has a lower surface 110d and an upper surface 110u that extend smoothly on both the radially projecting portion 111 and the axially projecting portion 112. As illustrated in FIG. 7, the lower surface 110d of the first guide portion 110 is formed to be inclined upward toward the working oil storage chamber 65 (rightward in FIG. 7). On the other hand, as illustrated in FIG. 7, the upper surface 110u of the first guide portion 110 is formed to be inclined downward toward the working oil storage chamber 65 (rightward in FIG. 7).

As illustrated in FIGS. 7 and 8, the second guide portion 120 has: a radially projecting portion 121 that extends along the upper edge portion 102a of the second opening portion 102 in the ring gear covering portion 73 and that projects in the radial direction of the differential ring gear 45 from the outer peripheral surface of the ring gear covering portion 73; and an axially projecting portion 122 that extends along the upper edge portion 102a of the second opening portion 102 in the flange portion 72 from one end of the radially projecting portion 121 and that projects in the axial direction of the differential ring gear 45 from a surface of the flange portion 72 on the working oil storage chamber 65 side.

As illustrated in FIG. 8, the axially projecting portion 122 of the second guide portion 120 extends so as to be inclined downward toward the inner peripheral side of the flange portion 72 along the upper edge portion 102a of the second opening portion 102 to a position that is generally the same as an extension line (see the broken line in FIG. 8) of the edge portion 102b of the second opening portion 102. That is, the axially projecting portion 122 of the second guide portion 120 is formed to extend to the inner peripheral side of the flange portion 72 with respect to the tooth root (root circle) of the differential ring gear 45, that is, to a position that is proximate to the axis 45o (see FIG. 3) of the differential ring gear 45.

In addition, the second guide portion 120 has a lower surface 120d and an upper surface 120u that extend smoothly on both the radially projecting portion 121 and the axially projecting portion 122. As illustrated in FIG. 7, the lower surface 120d of the second guide portion 120 is formed to be inclined upward toward the working oil storage chamber 65 (rightward in FIG. 7) at generally the same inclination angle as that of the lower surface 110d of the first guide portion 110. On the other hand, as illustrated in FIG. 7, the upper surface 120u of the second guide portion 120 is formed to be inclined downward toward the working oil storage chamber 65 (rightward in FIG. 7) at generally the same inclination angle as that of the upper surface 110u of the first guide portion 110.

As illustrated in FIGS. 7 and 8, the third guide portion 130 has: a radially projecting portion 131 that extends along a lower edge portion 73a of the ring gear covering portion 73 below the second opening portion 102 in the ring gear covering portion 73 and that projects in the radial direction of the differential ring gear 45 from the outer peripheral surface of the ring gear covering portion 73; and an axially projecting portion 132 that extends at an angle that generally matches that of the lower edge portion of the second opening portion 102 below the second opening portion 102 in the flange portion 72 from one end of the radially projecting portion 131 and that projects in the axial direction of the differential ring gear 45 from a surface of the flange portion 72 on the working oil storage chamber 65 side.

As illustrated in FIG. 8, the axially projecting portion 132 of the third guide portion 130 extends to a position that is generally the same as an extension line (see the broken line in FIG. 8) of the edge portion 102b of the second opening portion 102 below the second opening portion 102. In addition, as illustrated in FIG. 7, an upper surface 130u of the radially projecting portion 131 of the third guide portion 130 is formed to be inclined downward toward the working oil storage chamber 65 (rightward in FIG. 7). It should be noted, however, that the inclination angles of the lower surfaces 110d and 120d and the upper surfaces 110u, 120u, and 130u of the first, second, and third guide portions 110, 120, and 130 are not limited to those according to the embodiment.

In the embodiment, in addition, as illustrated in FIGS. 6 to 8, the wall portion 742 of the filling portion 74 has a receiving portion 742a formed so as to cover the lower side of the first opening portion 101 in the flange portion 72. The bottom portion 741 of the filling portion 74 is provided with: a through hole 741o through which working oil that has flowed into the filling portion 74 is discharged to the working oil storage chamber 65; and an opening/closing mechanism 75 that allows working oil to be discharged from the inside of the filling portion 74 via the through hole 741o and that closes the through hole 741o in accordance with the flow of working oil in the working oil storage chamber 65. The opening/closing mechanism 75 has a shield plate 751 that can abut against a surface of the bottom portion 741 so as to close the through hole 741o and a pressure receiving plate 752 that extends from the shield plate 751, and is turnably attached to the bottom portion 741.

Consequently, in the case where working oil in the working oil storage chamber 65 is not easily moved toward the rear side of the vehicle, e.g. in the case where the vehicle on which the power transfer device 20 is mounted is traveling on a flat road, the opening/closing mechanism 75 is moved away from the bottom portion 741 because of the weight of the shield plate 751 and the pressure receiving plate 752 to uncover the through hole 741o. As a result, working oil in the filling portion 74 can be discharged to the working oil storage chamber 65 via the through hole 741o in the case where the vehicle is traveling on a flat road, for example. In the case where working oil in the working oil storage chamber 65 tends to be moved toward the rear portion of the vehicle, e.g. in the case where the vehicle on which the power transfer device 20 is mounted starts, on the other hand, the opening/closing mechanism 75 is turned in the direction of approaching the bottom portion 741 by a force received from working oil mainly by the pressure receiving plate 752, and the shield plate 751 abuts against the bottom portion 741 to close the through hole 741o. As a result, it is possible to suppress an inflow of working oil in the working oil storage chamber 65 into the filling portion 74 via the through hole 741o when the vehicle starts or the like.

During travel of the vehicle on which the power transfer device 20 configured as discussed above is mounted, working oil in the differential chamber 60 raked up by rotation of the differential ring gear 45 is discharged from the first and second opening portions 101 and 102 which are formed in the reservoir plate 70 to the outside of the differential chamber 60. In the embodiment, as illustrated in FIG. 7, the differential ring gear 45 is constituted as a helical gear, and disposed so as to rake up working oil in the differential chamber 60 obliquely toward the working oil storage chamber 65 (rightward in FIG. 7) as indicated by the solid arrows in FIG. 7 when the differential ring gear 45 is rotated in the main rotational direction, that is, in the rotational direction (see the broken arrow indicated in FIG. 3) at the time when the vehicle on which the power transfer device 20 is mounted travels forward. That is, as illustrated in FIG. 7, the teeth of the differential ring gear 45 are formed to be inclined downward toward the working oil storage chamber 65 as seen in the radial direction of the differential ring gear 45 from the first and second opening portions 101 and 102. Consequently, working oil in the differential chamber 60 raked up obliquely toward the working oil storage chamber 65, that is, toward the flange portion 72, by rotation of the differential ring gear 45 can be discharged well to the outside of the differential chamber 60, in particular toward the working oil storage chamber 65 (rightward in FIG. 7), via the first and second opening portions 101 and 102 which are formed across the ring gear covering portion 73 and the flange portion 72.

A part of working oil raked up obliquely toward the working oil storage chamber 65 by rotation of the differential ring gear 45 and discharged from the first and second opening portions 101 and 102 collides against the lower surfaces 110d and 120d of the first and second guide portions 110 and 120 which extend along the upper edge portions 101a and 102a of the first and second opening portions 101 and 102. As discussed above, the lower surfaces 110d and 120d of the first and second guide portions 110 and 120 are formed to be inclined upward toward the working oil storage chamber 65, that is, inclined in the same direction as the scattering direction of working oil raked up by rotation of the differential ring gear 45.

Consequently, it is possible to reduce a component in the vertical direction of a reaction force received by working oil that has collided against the lower surfaces 110d and 120d of the first and second guide portions 110 and 120, and to increase a component of the reaction force in the horizontal direction toward the working oil storage chamber 65, compared to a case where the lower surfaces 110d and 120d extend horizontally in the axial direction of the differential ring gear 45, for example. As a result, as indicated by the solid arrows in FIG. 7, working oil raked up obliquely by rotation of the differential ring gear 45 and having collided against the lower surfaces 110d and 120d can be led (splashed back) toward the working oil storage chamber 65 (rightward in FIG. 7) and downward without flowing directly downward. Thus, it is possible to better restrain a part of working oil raked up obliquely by rotation of the differential ring gear 45 and discharged from the first and second opening portions 101 and 102 from colliding against the transmission case 22 to be splashed back toward the first and second opening portions 101 and 102 to flow into the differential chamber 60 again via the first and second opening portions 101 and 102, and to restrain working oil that has collides against the lower surfaces 110d and 120d of the first and second guide portions 110 and 120 from flowing directly downward to flow from the first and second opening portions 101 and 102 into the differential chamber 60 again.

In addition, the axially projecting portions 112 and 122 of the first and second guide portions 110 and 120 are formed to extend to the inner peripheral side of the flange portion 72 with respect to the tooth root (root circle) of the differential ring gear 45, that is, to a position that is proximate to the axis 45o of the differential ring gear 45. Consequently, it is possible to more reliably lead (splash back) working oil raked up by rotation of the differential ring gear 45 and discharged from the first and second opening portions 101 and 102 in the flange portion 72 toward the working oil storage chamber 65 (rightward in FIG. 7) and downward using the axially projecting portions 112 and 122 of the first and second guide portions 110 and 120, and to better restrain the working oil from colliding against the transmission case 22 (converter housing 221) to be splashed back toward the first and second opening portions 101 and 102 to flow into the differential chamber 60 again via the first and second opening portions 101 and 102.

Further, the first and second guide portions 110 and 120 also function to suppress an inflow of working oil flowing down from a location above the first and second opening portions 101 and 102 into the differential chamber 60 from the first and second opening portions 101 and 102. That is, as indicated by the broken arrows in FIG. 7, working oil flowing down from above the first opening portion 101 is received by the upper surface 110u of the first guide portion 110 which is formed to be inclined downward toward the working oil storage chamber 65, and led toward the working oil storage chamber 65. In addition, as indicated by the broken arrows in FIG. 7, working oil flowing down from above the second opening portion 102, such as working oil discharged mainly from the first opening portion 101, is received by the upper surface 120u of the second guide portion 120 which is formed to be inclined downward toward the working oil storage chamber 65, and led toward the working oil storage chamber 65.

In the embodiment, in addition, the third guide portion 130 is formed on the ring gear covering portion 73 and the flange portion 72 so as to cover the lower side of the second opening portion 102. Consequently, as indicated by the broken arrows in FIG. 7, working oil discharged from the second opening portion 102 and flowing downward toward the lower edge portion 73a of the ring gear covering portion 73 is received by the upper surface 130u of the radially projecting portion 131 of the third guide portion 130 which is formed to be inclined downward toward the working oil storage chamber 65, and led toward the working oil storage chamber 65. As a result, it is possible to well suppress an inflow of working oil discharged from the second opening portion 102 and flowing downward toward the lower edge portion 73a of the ring gear covering portion 73 into the differential chamber 60 via a clearance between the lower edge portion 73a and the transmission case 22.

As discussed above, working oil discharged from the first opening portion 101 toward the working oil storage chamber 65 (rightward in FIG. 7) and working oil received by the upper surface 110u of the first guide portion 110 to be led toward the working oil storage chamber 65 are mainly received by the receiving portion 742a of the filling portion 74 to flow into the filling portion 74, and returned to the working oil storage chamber 65 via the through hole 741o which is formed in the bottom portion 741 in the case where the vehicle on which the power transfer device 20 is mounted is traveling on a flat road or the like. With the filling portion 74 receiving working oil discharged from the first opening portion 101 etc. in this way, an inflow of the working oil from the second opening portion 102 into the differential chamber 60 can be suppressed. On the other hand, working oil discharged from the second opening portion 102 toward the working oil storage chamber 65 (rightward in FIG. 7) and working oil received by the upper surface 120u of the second guide portion 120 and the upper surface 130u of the third guide portion 130 to be led toward the working oil storage chamber 65 (rightward in FIG. 7) are directly returned to the working oil storage chamber 65.

In this way, with the power transfer device 20 according to the embodiment, it is possible to discharge working oil that has flowed into the differential chamber 60 to the working oil storage chamber 65 via the first and second opening portions 101 and 102 well, and to suppress an inflow of working oil into the differential chamber 60 via the first and second opening portions 101 and 102 well. Thus, a residence of working oil in the differential chamber 60 can be suppressed well, and the rotational resistance of the differential ring gear 45 (stirring resistance) can be further reduced.

In the embodiment, the present disclosure is applied to the reservoir plate 70 which serves as the partitioning member which has the differential covering portion 71, the flange portion 72, and the ring gear covering portion 73. However, the present disclosure may be applied to a partitioning member of any shape that has the ring gear covering portion 73 which covers a part of the differential ring gear 45 and that can separate the differential chamber 60 and the working oil storage chamber 65 from each other. In addition, the first and second opening portions 101 and 102 are formed across the ring gear covering portion 73 and the flange portion 72. However, the first and second opening portions 101 and 102 may be formed in only the ring gear covering portion 73. In this case, the axially projecting portions 112 and 122 may be omitted from the first and second guide portions 110 and 120. In addition, the upper surfaces 110u and 120u of the first and second guide portions 110 and 120 may not necessarily be inclined downward toward the working oil storage chamber 65. Further, it is only necessary that at least one opening portion and at least one guide portion that extends along the upper edge portion of the opening portion should be formed on the flange portion 72 and the ring gear covering portion 73, and three or more opening portions and three or more guide portions may be formed.

As has been described above, the present disclosure provides a power transfer device including: a differential ring gear meshed with a drive pinion gear to which power from a transmission is transferred; a differential gear coupled to the differential ring gear; a case that houses the differential ring gear and the differential gear; and a partitioning member that partitions a space in the case into a differential chamber, in which the differential ring gear and the differential gear are disposed, and a working oil storage chamber, in which working oil is stored, and further including: a ring gear covering portion that has an opening portion configured to discharge working oil splashed by the differential ring gear to an outside of the differential chamber and a guide portion that extends along an upper edge portion of the opening portion and that projects from an outer peripheral surface toward an outer side in a radial direction of the differential ring gear, the ring gear covering portion covering a part of an outer peripheral surface of the differential ring gear, in which: the differential ring gear is a helical gear disposed so as to rake up working oil in the differential chamber obliquely toward the working oil storage chamber when the differential ring gear is rotated in a main rotational direction; and a lower surface of the guide portion is formed to be inclined upward toward the working oil storage chamber.

That is, in the power transfer device according to the present disclosure, when the differential ring gear is rotated in the main rotational direction, working oil in the differential chamber is raked up obliquely toward the working oil storage chamber by rotation of the differential ring gear, and discharged to the outside of the differential chamber via the opening portion in the ring gear covering portion. A part of the working oil discharged from the opening portion hits on the lower surface of the guide portion which extends along the upper edge portion of the opening portion and which projects in the radial direction of the differential ring gear from the outer peripheral surface to be led toward the working oil storage chamber. In this event, with the lower surface of the guide portion formed to be inclined upward toward the working oil storage chamber, that is, inclined in the same direction as the scattering direction of working oil raked up by rotation of the differential ring gear, working oil that has collided against the lower surface of the guide portion can be splashed back toward the working oil storage chamber without flowing directly downward. As a result, it is possible to better restrain working oil that has collided against the lower surface of the guide portion from flowing directly downward to flow from the opening portion into the differential chamber again. Thus, with the power transfer device according to the present disclosure, it is possible to better suppress a residence of working oil in the differential chamber by the partitioning member which separates the differential chamber, in which the differential ring gear and the differential gear are disposed, and the working oil storage chamber, in which working oil is stored, from each other.

Teeth of the differential ring gear may be formed to be inclined downward toward the working oil storage chamber as seen in the radial direction from the opening portion.

An upper surface of the guide portion may be formed to be inclined downward toward the working oil storage chamber. Consequently, working oil flowing downward from above the opening portion of the ring gear covering portion can be led toward the working oil storage chamber by the upper surface of the guide portion, and an inflow of the working oil from the opening portion into the differential chamber can be suppressed better.

The ring gear covering portion may be molded integrally with the partitioning member. It should be noted, however, that the ring gear covering portion may be separated from the partitioning member. For example, the ring gear covering portion may extend from the case, for example.

The partitioning member may have a differential covering portion that covers a part of the differential gear and a flange portion which extends from one end of the differential covering portion on the differential ring gear side toward the outer side in the radial direction and at an outer peripheral portion of which the ring gear covering portion is formed; the working oil storage chamber may be defined between the differential covering portion and the flange portion and the case; the opening portion may be formed across the ring gear covering portion and the flange portion; and the guide portion may have a portion that extends to a position that is proximate to an axis of the differential ring gear with respect to a tooth root of the differential ring gear along the upper edge portion of the opening portion which is formed in the flange portion, and that projects in an axial direction of the differential ring gear from a surface of the flange portion on the working oil storage chamber side.

Consequently, working oil in the differential chamber raked up obliquely toward the working oil storage chamber, that is, toward the flange portion, by rotation of the differential ring gear can be better discharged from the opening portion which is formed in the ring gear covering portion and the flange portion. In addition, by forming the guide portion so as to extend along the upper edge portion of the opening portion in the flange portion to a position that is proximate to the axis of the differential ring gear with respect to the tooth root of the differential ring gear, working oil raked up by rotation of the differential ring gear and discharged from the opening portion in the flange portion can be more reliably led to the working oil storage chamber by the guide portion.

The ring gear covering portion may include the opening portion which is formed so as to intersect a horizontal plane that passes through an axis of the differential ring gear.

The present disclosure is not limited to the embodiment described above in any way, and it is a matter of course that the subject matter may be modified in various ways without departing from the broad scope of the present disclosure. Further, the mode for carrying out the disclosure described above is merely a specific form of the disclosure described in the "SUMMARY" section, and does not limit the elements described therein.

INDUSTRIAL APPLICABILITY

The present disclosure is applicable to, for example, the power transfer device manufacturing industry, etc.

The invention claimed is:

1. A power transfer device including: a differential ring gear meshed with a drive pinion gear to which power from a transmission is transferred; a differential gear coupled to the differential ring gear; a case that houses the differential ring gear and the differential gear; and a partitioning member that partitions a space in the case into a differential chamber, in which the differential ring gear and the differential gear are disposed, and a working oil storage chamber, in which working oil is stored, comprising:
   a ring gear covering portion that has an opening portion configured to discharge working oil raked up by the differential ring gear to an outside of the differential chamber and a guide portion that extends along an upper edge portion of the opening portion and that projects from an outer peripheral surface toward an outer side in a radial direction of the differential ring gear, the ring gear covering portion covering a part of an outer peripheral surface of the differential ring gear, wherein:
   the differential ring gear is a helical gear disposed so as to rake up working oil in the differential chamber obliquely toward the working oil storage chamber when the differential ring gear is rotated in a main rotational direction; and
   a lower surface of the guide portion is formed to be inclined upward toward the working oil storage chamber.

2. The power transfer device according to claim 1, wherein
   teeth of the differential ring gear are formed to be inclined downward toward the working oil storage chamber as seen in the radial direction from the opening portion.

3. The power transfer device according to claim 2, wherein
   an upper surface of the guide portion is formed to be inclined downward toward the working oil storage chamber.

4. The power transfer device according to claim 3, wherein
   the ring gear covering portion is molded integrally with the partitioning member.

5. The power transfer device according to claim 4, wherein:
   the partitioning member has a differential covering portion that covers a part of the differential gear and a flange portion which extends from one end of the differential covering portion on the differential ring gear side toward the outer side in the radial direction and at an outer peripheral portion of which the ring gear covering portion is formed;
   the working oil storage chamber is defined between the differential covering portion and the flange portion and the case;
   the opening portion is formed across the ring gear covering portion and the flange portion; and
   the guide portion has a portion that extends to a position that is proximate to an axis of the differential ring gear with respect to a tooth root of the differential ring gear along the upper edge portion of the opening portion which is formed in the flange portion, and that projects in an axial direction of the differential ring gear from a surface of the flange portion on the working oil storage chamber side.

6. The power transfer device according to claim 5, wherein
   the ring gear covering portion includes the opening portion which is formed so as to intersect a horizontal plane that passes through an axis of the differential ring gear.

7. The power transfer device according to claim 4, wherein
   the ring gear covering portion includes the opening portion which is formed so as to intersect a horizontal plane that passes through an axis of the differential ring gear.

8. The power transfer device according to claim 3, wherein
   the ring gear covering portion includes the opening portion which is formed so as to intersect a horizontal plane that passes through an axis of the differential ring gear.

9. The power transfer device according to claim 2, wherein
   the ring gear covering portion is molded integrally with the partitioning member.

10. The power transfer device according to claim 9, wherein:
    the partitioning member has a differential covering portion that covers a part of the differential gear and a flange portion which extends from one end of the differential covering portion on the differential ring gear side toward the outer side in the radial direction and at an outer peripheral portion of which the ring gear covering portion is formed;
    the working oil storage chamber is defined between the differential covering portion and the flange portion and the case;
    the opening portion is formed across the ring gear covering portion and the flange portion; and
    the guide portion has a portion that extends to a position that is proximate to an axis of the differential ring gear with respect to a tooth root of the differential ring gear along the upper edge portion of the opening portion which is formed in the flange portion, and that projects in an axial direction of the differential ring gear from a surface of the flange portion on the working oil storage chamber side.

11. The power transfer device according to claim 10, wherein
    the ring gear covering portion includes the opening portion which is formed so as to intersect a horizontal plane that passes through an axis of the differential ring gear.

12. The power transfer device according to claim 1, wherein
    an upper surface of the guide portion is formed to be inclined downward toward the working oil storage chamber.

13. The power transfer device according to claim 12, wherein
    the ring gear covering portion is molded integrally with the partitioning member.

14. The power transfer device according to claim 13, wherein:
    the partitioning member has a differential covering portion that covers a part of the differential gear and a flange portion which extends from one end of the differential covering portion on the differential ring gear side toward the outer side in the radial direction and at an outer peripheral portion of which the ring gear covering portion is formed;

the working oil storage chamber is defined between the differential covering portion and the flange portion and the case;

the opening portion is formed across the ring gear covering portion and the flange portion; and the guide portion has a portion that extends to a position that is proximate to an axis of the differential ring gear with respect to a tooth root of the differential ring gear along the upper edge portion of the opening portion which is formed in the flange portion, and that projects in an axial direction of the differential ring gear from a surface of the flange portion on the working oil storage chamber side.

15. The power transfer device according to claim 14, wherein
the ring gear covering portion includes the opening portion which is formed so as to intersect a horizontal plane that passes through an axis of the differential ring gear.

16. The power transfer device according to claim 1, wherein
the ring gear covering portion is molded integrally with the partitioning member.

17. The power transfer device according to claim 16, wherein:

the partitioning member has a differential covering portion that covers a part of the differential gear and a flange portion which extends from one end of the differential covering portion on the differential ring gear side toward the outer side in the radial direction and at an outer peripheral portion of which the ring gear covering portion is formed;

the working oil storage chamber is defined between the differential covering portion and the flange portion and the case;

the opening portion is formed across the ring gear covering portion and the flange portion; and the guide portion has a portion that extends to a position that is proximate to an axis of the differential ring gear with respect to a tooth root of the differential ring gear along the upper edge portion of the opening portion which is formed in the flange portion, and that projects in an axial direction of the differential ring gear from a surface of the flange portion on the working oil storage chamber side.

18. The power transfer device according to claim 17, wherein
the ring gear covering portion includes the opening portion which is formed so as to intersect a horizontal plane that passes through an axis of the differential ring gear.

* * * * *